(12) United States Patent
Hong

(10) Patent No.: US 8,461,791 B2
(45) Date of Patent: Jun. 11, 2013

(54) INVERTER FOR ELECTRIC VEHICLE

(75) Inventor: Chan Ook Hong, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 233 days.

(21) Appl. No.: 13/161,398

(22) Filed: Jun. 15, 2011

(65) Prior Publication Data

US 2012/0001578 A1    Jan. 5, 2012

(30) Foreign Application Priority Data

Jul. 2, 2010    (KR) .................. 10-2010-0064117

(51) Int. Cl.
*B60L 15/20*    (2006.01)
*H02P 7/285*    (2006.01)

(52) U.S. Cl.
USPC ...... 318/446; 318/400.34; 318/778; 123/350; 123/399; 123/436; 701/93; 701/12; 701/103

(58) Field of Classification Search
USPC .............. 318/446, 778, 400.34; 123/350, 123/399, 436; 701/102, 103, 93
See application file for complete search history.

(56) References Cited

U.S. PATENT DOCUMENTS

| | | | | |
|---|---|---|---|---|
| 4,169,437 A | * | 10/1979 | Fleischer | 123/361 |
| 4,323,042 A | * | 4/1982 | Woodhouse et al. | 123/436 |
| 4,329,960 A | * | 5/1982 | Woodhouse et al. | 123/436 |
| 4,461,958 A | * | 7/1984 | Krohling et al. | 290/45 |
| 4,492,195 A | * | 1/1985 | Takahashi et al. | 123/339.11 |
| 4,727,490 A | * | 2/1988 | Narita et al. | 701/65 |
| 4,766,967 A | * | 8/1988 | Slicker et al. | 180/54.1 |
| 4,771,849 A | * | 9/1988 | Leiber et al. | 180/197 |
| 4,852,008 A | * | 7/1989 | Sager | 701/70 |
| 4,853,857 A | * | 8/1989 | Oshiage et al. | 701/60 |
| 4,915,075 A | * | 4/1990 | Brown | 123/399 |
| 5,074,267 A | * | 12/1991 | Ironside et al. | 123/399 |
| 5,193,506 A | * | 3/1993 | Ironside et al. | 123/399 |
| 5,251,138 A | * | 10/1993 | Katayama | 701/95 |
| 5,255,653 A | * | 10/1993 | Ironside et al. | 123/399 |
| 5,583,406 A | * | 12/1996 | Mutoh et al. | 318/376 |
| 5,726,886 A | * | 3/1998 | Yamakado et al. | 701/93 |
| 6,163,119 A | * | 12/2000 | Jeong | 318/400.34 |
| 7,222,011 B2 | * | 5/2007 | Smith et al. | 701/51 |
| 7,549,407 B2 | * | 6/2009 | Krupadanam | 123/399 |
| 7,577,511 B1 | * | 8/2009 | Tripathi et al. | 701/103 |
| 7,849,835 B2 | * | 12/2010 | Tripathi et al. | 123/350 |
| 7,886,715 B2 | * | 2/2011 | Tripathi et al. | 123/350 |
| 7,932,691 B2 | * | 4/2011 | Son et al. | 318/727 |
| 7,938,494 B2 | * | 5/2011 | Ribbens et al. | 303/112 |
| 7,954,474 B2 | * | 6/2011 | Tripathi et al. | 123/350 |
| 8,005,588 B2 | * | 8/2011 | Dower | 701/22 |
| 8,099,224 B2 | * | 1/2012 | Tripathi et al. | 701/102 |
| 8,131,445 B2 | * | 3/2012 | Tripathi et al. | 701/102 |

(Continued)

*Primary Examiner* — Paul Ip
(74) *Attorney, Agent, or Firm* — Lee, Hong, Degerman, Kang & Waimey

(57) ABSTRACT

An inverter for an electric vehicle includes a speed instruction generating unit, a frequency voltage converting unit, an integrator and a 2-to-3 phase converter. The speed instruction generating unit outputs a speed instruction for changing the rotational frequency of an electric motor based on the on/off of a signal outputted from the accelerator pedal. The frequency voltage converting unit outputs a voltage instruction based on the frequency of the speed instruction. The integrator outputs a rotational angle by performing integration on the frequency of the speed instruction. The 2-to-3 phase converter receives the voltage instruction and the rotational angle and converts the received voltage instruction and rotational angle into three-phase voltage instructions.

7 Claims, 4 Drawing Sheets

U.S. PATENT DOCUMENTS

| | | | |
|---|---|---|---|
| 8,131,447 B2 * | 3/2012 | Tripathi et al. | 701/103 |
| 8,135,531 B2 * | 3/2012 | Zhao et al. | 701/93 |
| 8,336,521 B2 * | 12/2012 | Tripathi et al. | 123/350 |
| 2004/0176903 A1 * | 9/2004 | Yasu | 701/101 |
| 2005/0075766 A1 * | 4/2005 | Kobayashi et al. | 701/22 |
| 2006/0020384 A1 * | 1/2006 | Smith et al. | 701/54 |
| 2008/0237517 A1 * | 10/2008 | Krupadanam | 251/129.01 |
| 2009/0048748 A1 * | 2/2009 | Zhao et al. | 701/59 |
| 2009/0261775 A1 * | 10/2009 | Son et al. | 318/778 |
| 2010/0006065 A1 * | 1/2010 | Tripathi et al. | 123/350 |
| 2010/0010724 A1 * | 1/2010 | Tripathi et al. | 701/103 |

* cited by examiner

INVERTER FOR ELECTRIC VEHICLE

CROSS-REFERENCE TO RELATED APPLICATION

This application claims the benefit of Korean Patent Application No. 10-2010-0064117, filed on Jul. 2, 2010, the disclosure of which is hereby incorporated herein by reference in its entirety.

BACKGROUND OF THE INVENTION

1. Field of the Invention

An aspect of the present invention relates to an inverter for an electric vehicle, and more specifically, to an inverter for an electric vehicle, which enables a driver to maintain the driving sensation of the electric vehicle, similar to that in a vector control before a defect of a speed (position) sensor of the electric vehicle occurs, under a voltage/frequency (V/f) control, even when the vector control is impossible due to the defect.

2. Description of the Related Art

In general, an electric motor driven by an inverter operates in a speed control mode. The inverter receives a speed at which the electric motor is to be rotated, inputted from an outside (driver), and controls an output voltage of the inverter so that the electric motor is rotated based on instruction of the inputted speed.

On the other hand, an inverter for an electric vehicle does not directly receive the instruction of a speed inputted from an outside (driver) but controls an output voltage of the inverter in response to an input of an accelerator pedal installed in the electric vehicle. That is, if it is sensed that the driver has pushed the accelerator pedal, the electric vehicle continuously increases speed by increasing the rotational frequency of the electric motor in proportion to pushed degree of the accelerator pedal. If the driver pulls off his/her foot from the acceleration pedal, the inverter controls the electric vehicle to decrease speed by decreasing the rotational frequency of the electric motor through the generation of a zero output torque or reverse output torque of the electric motor.

The control method of the inverter for the electric vehicle is not a speed control method in which the inverter controls a speed of the electric motor by receiving the instruction of the speed, but may be a torque control method in which the inverter controls a torque of the electric motor based on the state of the accelerator pedal, which is a result (pushing the accelerator pedal when the speed is low and pulling off the his/her foot from the accelerator pedal or depressing a brake when the speed is high) obtained by driver's controlling the speed (rotational frequency of the electric motor) of the electric vehicle.

That is, the control of the electric motor is divided into a scalar control method that requires no input of a speed (position) sensor and a vector control method that requires a sensor. Generally, the vector control method capable of performing an instantaneous torque control is widely used in the control of the electric vehicle.

If the speed sensor fails under the driving of the electric vehicle, it is impossible to drive the electric vehicle using the vector control method. Therefore, it is required to develop an inverter for an electric vehicle, provided with a speed instruction generating unit for generating a speed instruction under a voltage/frequency control as a scalar control method so that a driver can maintain the existing driving sensation of the electric vehicle as it is.

SUMMARY OF THE INVENTION

Embodiments of the present invention provide an inverter for an electric vehicle, and more specifically, to an inverter for an electric vehicle, which enables a driver to maintain the driving sensation of the electric vehicle, similar to that in a vector control before a defect of a speed (position) sensor of the electric vehicle occurs, under a voltage/frequency (V/f) control, even when the vector control is impossible due to the defect.

According to an aspect of the present invention, there is provided an inverter for an electric vehicle, the inverter including: a speed instruction generating unit configured to output a speed instruction for changing the rotational frequency of an electric motor based on the on/off of a signal outputted from the accelerator pedal; a frequency voltage converting unit configured to output a voltage instruction based on the frequency of the speed instruction; an integrator configured to output a rotational angle by performing integration on the frequency of the speed instruction; and a 2-to-3 phase converter configured to receive the voltage instruction and the rotational angle and convert the received voltage instruction and rotational angle into three-phase voltage instructions.

The speed instruction generating unit may include a storage in which a maximum frequency at which the electric motor is rotated, a frequency increment and a frequency decrement are stored; and a control unit configured to increase the frequency of the speed instruction by the frequency increment when the accelerator pedal is on, and decrease the frequency of the speed instruction by the frequency decrement when the accelerator pedal is off.

The frequency voltage converting unit outputs a voltage instruction of the electric motor, obtained by multiplying the frequency of the speed instruction by a ratio of rated voltage/rated frequency.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

The present invention is described more fully hereinafter with reference to the accompanying drawings, in which embodiments of the present invention are shown. This present invention may, however, be embodied in many different forms and should not be construed as limited to the embodiments set forth herein. Rather, these embodiments are provided so that this disclosure is thorough, and will fully convey the scope of the present invention to those skilled in the art.

Figure 1:
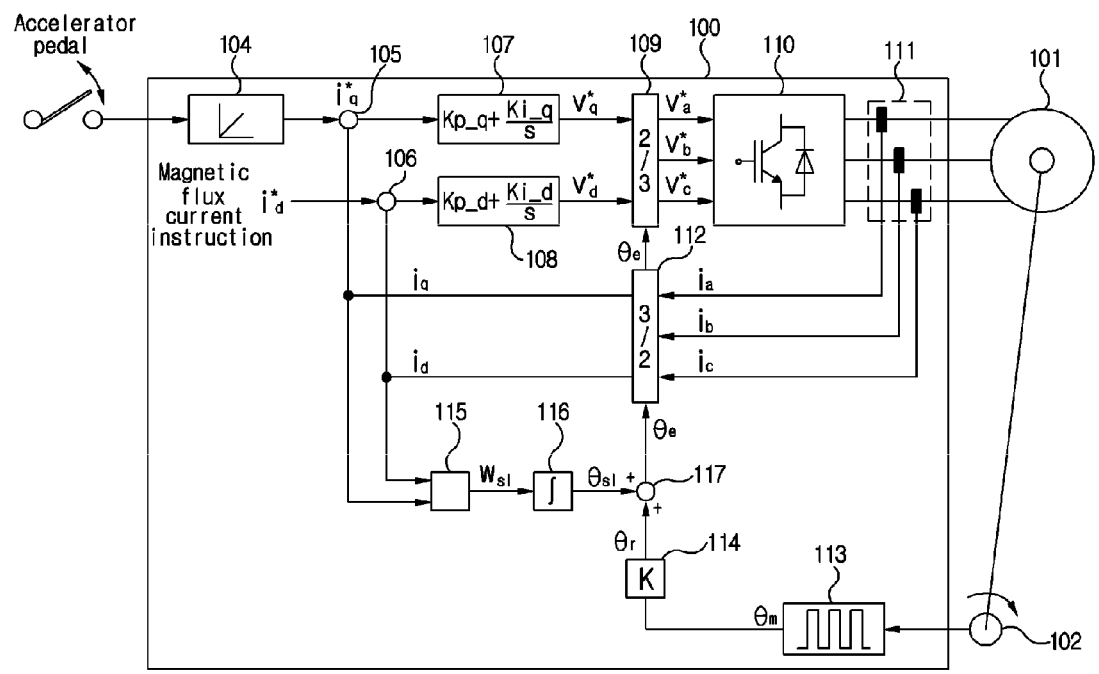
FIG. 1 is a block configuration view of an inverter for an electric vehicle, implemented by a vector control method using an output value of a position sensor.

FIG. 1 is a block configuration view of an inverter for an electric vehicle, implemented by a vector control method using an output value of a position sensor. First, the inverter for the electric vehicle will be described, which is implemented by the vector control method of independently controlling the flux current and torque current of an electric motor having a speed sensor attached thereto.

As shown in FIG. 1, the inverter 100 for the electric vehicle, implemented by the vector control method, outputs a voltage capable of rotating an electric motor 101 so as to drive the electric vehicle at a speed desired by a driver through the driver's operation of an accelerator pedal of the electric vehicle.

A speed sensor 102 (e.g., an incremental encoder) mounted to a shaft of the electric motor 101 first outputs a pulse in proportion to a change in rotation angle when the shaft of the electric motor 101 is rotated. A potentiometer 104 attached to the accelerator pedal of the electric vehicle outputs a torque current instruction i*q of the electric motor, which is in proportion to the degree of pushing of the accelerator pedal. For example, the potentiometer 104 outputs rated current when the driver completely pushes the accelerator pedal, and outputs 0A when the driver takes off his/her foot from the accelerator pedal.

A first subtractor 105 detects a torque current error by subtracting a torque current iq from the torque current instruction i*q. A second subtractor 106 detects a magnetic flux current error by subtracting a magnetic flux current id from a magnetic flux current instruction i*d. Here, each of the torque current iq and the magnetic flux current id is current outputted from a 3-to-2 phase converting unit 112.

A torque current control unit 107 generates a torque voltage instruction V*q using a proportional integral (PI) control based on the torque current error. In the torque current control unit 107, Kp_q denotes a proportional gain, Ki_q denotes an integral gain, and s denotes a Laplace operator. A magnetic flux current control unit 108 generates a magnetic flux voltage instruction V*d using a PI control based on the magnetic flux current error. In the magnetic flux current control unit 108, Kp_d denotes a proportional gain, Ki_d denotes an integral gain, and s denotes a Laplace operator.

A 2-to-3 converting unit 109 receives a magnetic flux angle $\theta_e$ of a rotor, inputted from the electric motor 101, and converts the torque voltage instruction V*q of the torque current control unit 107 and the magnetic flux voltage instruction V*d of the magnetic flux current control unit 108 into three-phase voltage instructions V*a, V*b and V*c using the following expressions 1 and 2.

$V^*ds=-\sin(\theta_e)^*V^*q+\cos(\theta_e)^*V^*d$ $V^*ds=\cos(\theta_e)^*V^*q+\sin(\theta_e)^*V^*d$ [Expression 1]

$V^*a=V^*ds$ $V^*b=(-0.5)^*(V^*ds-\text{SQRT}(3)^*V^*qs)$ $V^*c=(-0.5)^*(V^*ds+\text{SQRT}(3)^*V^*qs)$ [Expression 2]

Here, the V*ds and V*qs denote parameters.

A voltage regulating unit 110 including a power semiconductor element (insulated gate bipolar transistor: IGBT) receives the three-phase voltage instructions V*a, V*b and V*c inputted from the 2-to-3 phase converting unit 109, and applies three-phase output voltages respectively controlled by the three-phase voltage instructions V*a, V*b and V*c to the electric motor 101 using a pulse width modulation (PWM) technique.

Current sensors 111 are provided to three-phase output lines and detect three-phase currents ia, ib and ic of the electric motor 101, respectively. The 3-to-2phase converting unit 112 receives a magnetic flux angle $\theta_e$ of the rotor, inputted from the electric motor 101, and converts the three-phase currents ia, ib and ic of the electric motor 101 into the torque current iq and the magnetic flux current id using the following expressions 3 and 4.

$Ids=(2^*ia-ib-ic)/3$ $Iqs=(ib-ic)/\text{SQRT}(3)$ [Expression 3]

$iq=\cos(\theta_e)^*Iqs+\cos(\theta_e)^*Ids$ $id=\sin(\theta_e)^*Iqs+\sin(\theta_e)^*Ids$ [Expression 4]

Here, the Ids and Iqs denote parameters.

A pulse amplifier 113 receives a pulse string that is an output of the speed sensor 102, and calculates a mechanical position $\theta_m$ of the rotor of the electric motor. A multiplier 114 calculates an electrical position $\theta_r$ of the rotor of the electric motor by multiplying the mechanical position $\theta_r$ of the rotor of the electric motor by the constant K of 2/the number of poles. A slip frequency calculator 115 receives the magnetic flux current id and the torque current iq, which are outputs of the 3-to-2 phase converting unit 112, and calculates a slip frequency $W_{sl}$ of the electric motor 10 using the following expression 5.

$W_{s1}=Rr^*Iqs/(Lr^*Ids)$ [Expression 5]

Here, the Rr denotes a resistance of the rotor of the electric motor, and the Lr denotes an inductance of the rotor of the electric motor. The time constant Tr of the rotor is defined as Rr/Lr.

An integrator 116 calculates a slip angle $\theta_{sl}$ by performing integration on the slip frequency $W_{sl}$. An adder 117 calculates the magnetic flux angle ($\theta_e=\theta_{sl}+\theta_r$) of the rotor of the electric motor 101, which enables the torque and magnetic flux of the electric motor to be independently controlled by adding the slip angle $\theta_{sl}$ and the electrical position $\theta_r$ of the rotor of the electric motor. Here, the method of independently controlling the magnetic flux current and the torque current using the control method of the magnetic angle $\theta_e$ of the rotor is referred to as an indirect vector control method.

As described above, the inverter for the electric vehicle controls the torque of the electric motor 101 corresponding to the torque current instruction i*q inputted from the outside through the accelerator pedal, using the vector control method, thereby implementing an acceleration characteristic desired by the driver.

Figure 2:
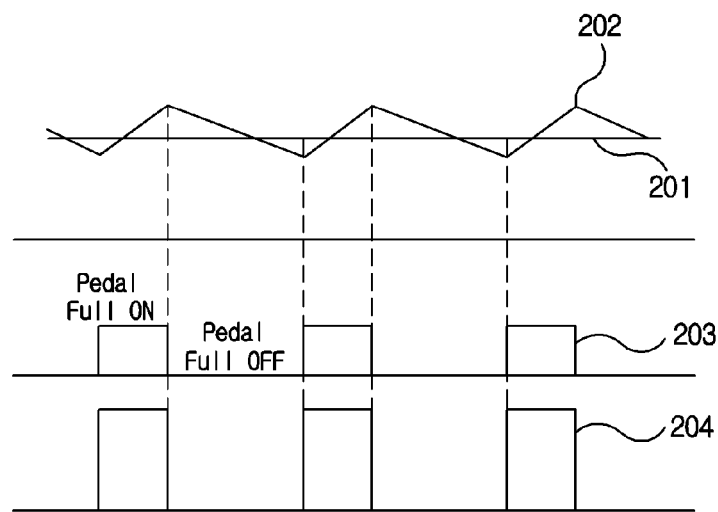
FIG. 2 is a graph showing torque of an induction motor, generated according to the degree of pushing of an accelerator pedal, by the vector control method.

FIG. 2 is a graph showing torque of an induction motor, generated according to the degree of pushing of an accelerator pedal, by the vector control method.

As shown in FIG. 2, if a speed 202 of the electric vehicle is less than a speed 201 of the electric vehicle, at which the driver intends to drive, the driver increases the speed of the electric vehicle by pushing the accelerator pedal so as to generate a torque from the electric motor. If the speed 202 of the electric vehicle is more than the speed 201 of the electric vehicle, at which the driver intends to drive, the driver takes off his/her foot from the accelerator pedal so that the torque of the electric motor becomes zero.

Since the form of a torque 204 of the electric motor is identical to the range of an input 203 of the accelerator pedal, the speed of the electric vehicle can be maintained constant by controlling the torque of the electric motor through a driver's repetitive operations of the accelerator pedal. A general vector control inverter is provided with an automatic speed regulator (ASR) for constantly maintaining a speed so that the inverter automatically controls the torque of an electric motor under a speed instruction inputted from an outside. On the other hand, since the driver takes charge in a speed controller in the inverter for the electric vehicle, the torque of the electric motor is controlled through the accelerator pedal. That is, the inverter for the electric vehicle operates in a torque control mode in which a torque instruction generated by the accelerator, instead of a speed instruction, is inputted from the outside.

Since the inverter for the electric vehicle does not operate in a speed control mode but operates in the torque control mode, an instantaneous torque control of the electric motor is required, and the vector control method is necessarily applied to the inverter for the electric vehicle. A speed sensor for detecting the rotation angle of the electric motor is necessarily required to perform the vector control method. Although a defect of the speed sensor occurs, the inverter for the electric vehicle can control the speed of the electric vehicle to be constant not by using the vector control method but by using a voltage/frequency control method that is a scalar control method.

However, if the rotation speed of the electric motor is controlled in proportion to the degree of pushing of the accelerator pedal in the vector control method, the accelerator pedal is necessarily fixed at a specific position so as to maintain the electric vehicle to have a constant speed. Therefore, the operating method of the accelerator pedal in the voltage/frequency control is different from that in the torque control at which the driver is previously good, and hence it is difficult for the driver to drive the electric vehicle while maintaining the existing driving sensation.

In a case where a defect of the speed sensor occurs, an inverter for an electric vehicle, implemented by a voltage/frequency control method according to an embodiment of the present invention will be described below.

Figure 3:
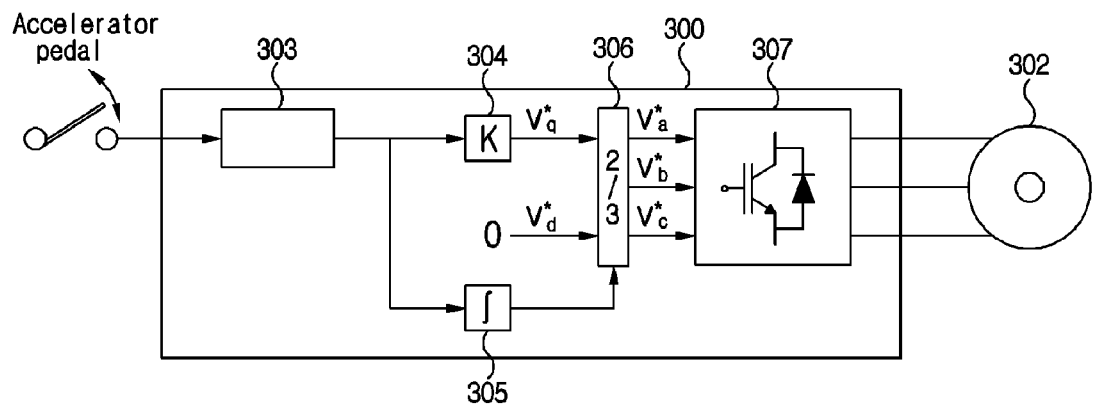
FIG. 3 is a block configuration view of an inverter for an electric vehicle, implemented by a voltage/frequency control method according to an embodiment of the present invention.

FIG. 3 is a block configuration view of an inverter for an electric vehicle, implemented by a voltage/frequency control method according to an embodiment of the present invention.

As shown in FIG. 3, the inverter 300 for the electric vehicle includes a speed instruction generating unit 303 that outputs a speed instruction, a frequency voltage converting unit 304, an integrator 305, a 2-to-3 phase converter 306 and a voltage regulating unit 307.

The speed instruction generating unit 303 senses a state that an accelerator pedal of the electric vehicle is pushed (the pushing of the accelerator pedal is referred to as 'ON') and generates a speed instruction We similar to the control characteristic in the torque control mode. The speed instruction generating unit 303 outputs a speed instruction capable of changing the speed of an electric motor 302 not by regulating a torque generated by a signal outputted from the accelerator pedal but by regulating the frequency of an applied electrical signal. That is, the speed instruction generating unit 303 increases the frequency at a predetermined rate when the signal outputted from the accelerator pedal is on, and decreases the frequency at a predetermined rate when the signal outputted from the accelerator pedal is off.

The frequency voltage converting unit 304 outputs a voltage instruction V*q (corresponding to a torque voltage instruction of the vector control) of the electric motor, obtained by multiplying the inputted speed instruction We by the ratio K of rated voltage/rated frequency of the electric motor 302. Since the speed sensor is in a defective state, the magnetic flux voltage instruction V*d of the vector control is set as zero in the voltage/frequency control. For example, in the case of an electric motor of which the rated voltage/rated frequency is 60 Hz/380V, the output of the frequency voltage converting unit 304 becomes 30*380/60=190V when the output of the speed instruction generating unit 303 is 30 Hz.

The integrator 305 evaluates the rotation angle $\theta_e$ of a voltage applied to the electric motor 302 by performing integration on the speed instruction We.

The 2-to-3 phase converter 306 receives the voltage instruction V*q that is an output of the frequency voltage converting unit 304, V*d=0 and the rotation angle $\theta_e$ that is an output of the integrator 305, and converts them into three-phase voltage instructions V*a, V*b and V*c using the following expressions 6 and 7.

$$V*ds = -\sin(\theta_e)*V*q$$

$$V*qs = \cos(\theta_e)*V*q \qquad \text{[Expression 6]}$$

$$V*a = V*ds$$

$$V*b = (-0.5)*(V*ds - \text{SQRT}(3)*V*qs)$$

$$V*c = (-0.5)*(V*ds - \text{SQRT}(3)*V*qs) \qquad \text{[Expression 7]}$$

Here, the V*ds and V*qs denote parameters.

The voltage regulating unit 307 including a power semiconductor element (IGBT) receives the three-phase voltage instructions V*a, V*b and V*c inputted from the 2-to-3 phase converter 306 and applies three-phase output voltages respectively controlled by the three-phase voltage instructions V*a, V*b and V*c to the electric motor 302 through the PWM, thereby driving the electric motor 302.

Figure 4:
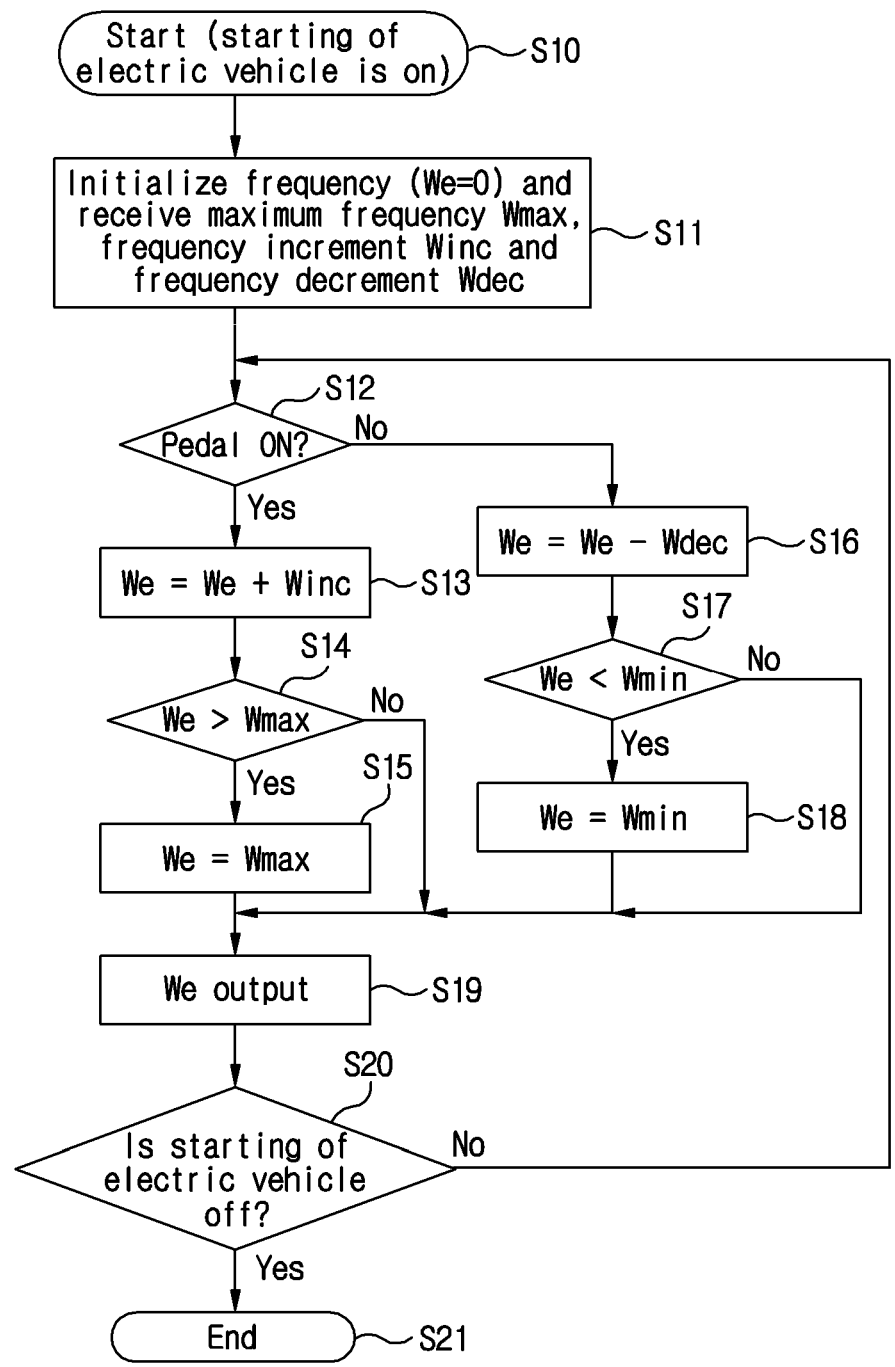
FIG. 4 is a flowchart illustrating a voltage/frequency control method of a speed instruction generating unit according to the embodiment of the present invention.

FIG. 4 is a flowchart illustrating a voltage/frequency control method of a speed instruction generating unit according to the embodiment of the present invention.

First, if the electric vehicle starts (S10), the speed instruction generating unit initializes the previous speed (frequency) instruction We as zero before generating a speed (frequency) instruction We. Then, the speed instruction generating unit reads the maximum frequency at which the electric motor can be rotated (hereinafter, referred to as Wmax), the instruction frequency increment when the accelerator pedal is on (hereinafter, referred to as Winc) and the instruction frequency decrement when the accelerator pedal is off (hereinafter, referred to as Wdec) previously stored in a storage (not shown) (S11).

Next, after receiving the Wmax, Winc and Wdec inputted from the storage, the speed instruction generating unit decides a state of the accelerator pedal (S12). In a case where the accelerator pedal is on, the speed instruction generating unit increase the frequency instruction We by the Winc (S13). In a case where the size of the frequency instruction We is greater than that of the Wmax by comparing the increased frequency instruction with the size of the Wmax (S14), the speed instruction generating unit limits the frequency instruction We to the Wmax (S15) and outputs the calculated frequency instruction We (S19).

Meanwhile, in a case where the accelerator pedal is off by deciding the state of the accelerator pedal (S12), the speed instruction generating unit decreases the frequency instruction by the Wdec (S16). In a case where the decreased frequency instruction is smaller than zero by comparing the decreased frequency instruction with the minimum frequency (S17), the speed instruction generating unit limits the frequency instruction We to the minimum frequency (S18) and outputs the calculated frequency instruction We. In a case where the decreased frequency instruction is not smaller than zero, the speed instruction generating unit outputs the decreased frequency instruction (S19). Then, if it is determined that the electric vehicle is driving, the speed instruction generating unit decides the state of the accelerator pedal (S12) and continuously performs the operation of generating the speed (frequency) instruction. In a case where the starting of the electric vehicle is off, the speed instruction generating unit ends the operation of generating the speed (frequency) instruction (S21).

Figure 5:
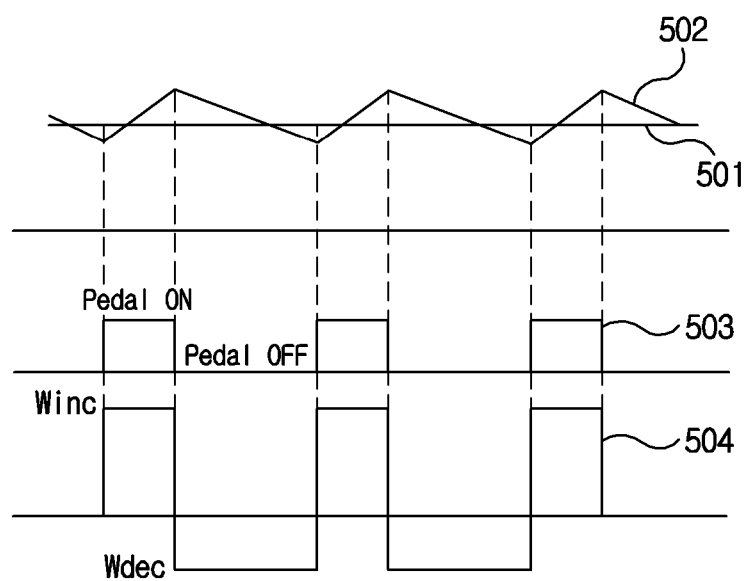
FIG. 5 is a graph showing a frequency instruction of the speed instruction generating unit according to the degree of pushing of an accelerator pedal, generated by the voltage/frequency control method according to the embodiment of the present invention.

FIG. 5 is a graph showing a frequency instruction of the speed instruction generating unit according to the degree of pushing of an accelerator pedal, generated by the voltage/frequency control method according to the embodiment of the present invention.

As shown in FIG. 5, the driver operates a state 503 of the accelerator pedal so that a speed 502 of the electric vehicle approaches a speed 501 of the electric vehicle, at which the driver intends to drive. The speed instruction generating unit increases or decreases a frequency instruction 504 at a predetermined rate, corresponding to the on- or off-state of the accelerator pedal.

That is, when comparing the off-state of the accelerator pedal of FIG. 5 with the off-state of the accelerator pedal of FIG. 2, the torque of the electric motor does not occur in the state that the accelerator pedal is off in FIG. 2, and hence the speed of the electric vehicle is naturally decreased. However, in FIG. 5, the frequency is decreased in the state that the accelerator pedal is off, thereby decreasing the speed of the electric vehicle.

Thus, the inverter for the electric vehicle increases or decreases the rotational frequency of the electric motor, so that when a defect of the speed sensor occurs, it is possible to provide the driver with the driving sensation of the electric vehicle, similar to that in the vector control before the defect occurs.

In an inverter for an electric vehicle according to embodiments of the present invention, when performing a voltage/frequency (V/f) control because a vector control is impossible due to the occurrence of a position (speed) sensor, the inverter increases the rotational frequency of an electric motor when a driver pushes an accelerator pedal and decreases the rotational frequency of the electric motor when the driver does not push the accelerator pedal, so that it is possible to provide the driver with the driving sensation of the electric vehicle, similar to that in the vector control before the defect occurs.

Although the present invention has been described in connection with the preferred embodiments, the embodiments of the present invention are only for illustrative purposes and should not be construed as limiting the scope of the present invention. It will be understood by those skilled in the art that various changes and modifications can be made thereto within the technical spirit and scope defined by the appended claims.

What is claimed is:

1. An inverter for an electric vehicle, the inverter comprising:
   a speed instruction generating unit connected to an accelerator pedal so as to output a speed instruction for changing the rotational frequency of an electric motor based on the on/off of a signal outputted from the accelerator pedal;
   a frequency voltage converting unit configured to output a voltage instruction based on the frequency of the speed instruction;
   an integrator configured to output a rotational angle by performing integration on the frequency of the speed instruction; and
   a 2-to-3 phase converter configured to receive the voltage instruction and the rotational angle and convert the received voltage instruction and the received rotational angle into three-phase voltage instructions.

2. The inverter of claim 1, further comprising a voltage regulating unit configured to receive the three-phase voltage instructions from the 2-to-3 phase converter and output three-phase output voltages to the electric motor using pulse width modulation (PWM).

3. The inverter of claim 1, wherein the speed instruction generating unit comprises:
   a storage in which a maximum frequency at which the electric motor is rotated, a frequency increment and a frequency decrement are stored; and
   a control unit configured to increase the frequency of the speed instruction by the frequency increment when the accelerator pedal is on, and decrease the frequency of the speed instruction by the frequency decrement when the accelerator pedal is off.

4. The inverter of claim 3, wherein the control unit regulates the frequency of the speed instruction within a range from a minimum frequency to the maximum frequency.

5. The inverter of claim 4, wherein, when the accelerator pedal is on, the control unit outputs the increased frequency of the speed instruction when the increased frequency of the speed instruction is smaller than the maximum frequency, and outputs the maximum frequency when the increased frequency of the speed instruction is greater than the maximum frequency.

6. The inverter of claim 4, wherein, when the accelerator pedal is off, the control unit outputs the decreased frequency of the speed instruction when the decreased frequency of the speed instruction is greater than the minimum frequency, and outputs the minimum frequency when the decreased frequency of the speed instruction is smaller than the minimum frequency.

7. The inverter of claim 1, wherein the frequency voltage converting unit outputs a voltage instruction of the electric motor, obtained by multiplying the frequency of the speed instruction by a ratio of rated voltage/rated frequency.

* * * * *